(12) United States Patent
Kim et al.

(10) Patent No.: US 12,009,151 B2
(45) Date of Patent: Jun. 11, 2024

(54) CAPACITOR COMPONENT

(71) Applicant: SAMSUNG ELECTRO-MECHANICS CO., LTD., Suwon-si (KR)

(72) Inventors: Min Soo Kim, Suwon-si (KR); Jung Hyun An, Suwon-si (KR); Yun Kim, Suwon-si (KR); Seung Yong Lee, Suwon-si (KR); Dong Chan Seo, Suwon-si (KR); Yu Ra Shin, Suwon-si (KR); Jin Bok Shin, Suwon-si (KR); Choong Seop Jeon, Suwon-si (KR); Yun Jeong Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 95 days.

(21) Appl. No.: 17/686,951

(22) Filed: Mar. 4, 2022

(65) Prior Publication Data

US 2023/0147982 A1    May 11, 2023

(30) Foreign Application Priority Data

Nov. 11, 2021    (KR) .................. 10-2021-0154820

(51) Int. Cl.
*H01G 4/12*         (2006.01)
*C04B 35/468*    (2006.01)
(Continued)

(52) U.S. Cl.
CPC ....... *H01G 4/1227* (2013.01); *C04B 35/4682* (2013.01); *C04B 35/62815* (2013.01); *C04B 35/64* (2013.01); *C04B 37/003* (2013.01); *H01G 4/2325* (2013.01); *C04B 2235/3224* (2013.01); *C04B 2235/3236* (2013.01); *C04B 2237/346* (2013.01)

(58) Field of Classification Search
CPC ................ H01G 4/1227; H01G 4/2325; C04B 35/4682; C04B 35/62815; C04B 35/64; C04B 37/003; C04B 2235/3224; C04B 2235/3236; C04B 2237/346

See application file for complete search history.

(56) References Cited

U.S. PATENT DOCUMENTS 10,580,575 B2 *   3/2020   Kim ..................... H01G 4/1227
2006/0284233 A1 *  12/2006  Suh ................... H01L 21/31691
                                                    257/E51.027
(Continued)

FOREIGN PATENT DOCUMENTS

CN       1393423 A     *   1/2003     ............. B82Y 30/00
DE   102010050553 A1   *   5/2011     ........... C01G 23/006
(Continued)

*Primary Examiner* — Jeffrey T Carley
(74) *Attorney, Agent, or Firm* — Morgan, Lewis & Bockius LLP

(57) ABSTRACT

A capacitor component includes a body including a dielectric layer and an internal electrode layer, and an external electrode disposed on the body and connected to the internal electrode layer. The dielectric layer includes dielectric grains, at least a portion of the dielectric grains has a core-shell structure, and a shell of the core-shell structure contains a rare earth element having an average concentration of more than 0.5 at %.

9 Claims, 9 Drawing Sheets

(51) Int. Cl.
*C04B 35/628* (2006.01)
*C04B 35/64* (2006.01)
*C04B 37/00* (2006.01)
*H01G 4/232* (2006.01)

(56) References Cited

U.S. PATENT DOCUMENTS

| | | | |
|---|---|---|---|
| 2008/0030921 A1* | 2/2008 | Kaneda | H01G 4/1227 |
| | | | 361/272 |
| 2009/0238954 A1* | 9/2009 | Suh | H05K 1/162 |
| | | | 427/79 |
| 2013/0083449 A1* | 4/2013 | Yoon | H01G 4/30 |
| | | | 501/137 |
| 2019/0279817 A1* | 9/2019 | Park | H01G 4/1263 |
| 2021/0175016 A1* | 6/2021 | Yun | H01G 4/2325 |
| 2023/0147982 A1* | 5/2023 | Kim | C04B 35/62815 |
| | | | 361/321.5 |

FOREIGN PATENT DOCUMENTS

| | | | | |
|---|---|---|---|---|
| JP | 2012094696 A | * | 5/2012 | |
| JP | 5535402 B2 | | 7/2014 | |
| KR | 20060102502 A | * | 9/2006 | |
| KR | 20130058583 A | * | 6/2013 | |
| KR | 10-2014-0049704 A | | 4/2014 | |
| KR | 10-2021-0071496 A | | 6/2021 | |
| WO | WO-2008102785 A9 | * | 9/2009 | B22F 9/16 |

* cited by examiner

CAPACITOR COMPONENT

CROSS-REFERENCE TO RELATED APPLICATION (S)

This application claims benefit under 35 USC 119 (a) of Korean Patent Application No. 10-2021-0154820 filed on Nov. 11, 2021 in the Korean Intellectual Property Office, the entire disclosure of which is incorporated herein by reference for all purposes.

TECHNICAL FIELD

The present disclosure relates to a capacitor component.

BACKGROUND

MLCCs, capacitor components, are important chip components used in industries such as the communications, computing, home appliance, and automobile industries due to small size, high capacitance, and ease thereof in mounting, and in detail, are key passive elements used in various electric, electronic and information communication devices such as mobile phones, computers, and digital TVs.

Recently, according to miniaturization and high performance of electronic devices, MLCCs have also tended to be smaller sized and higher in capacitance, and with this trend, the importance of securing high reliability of capacitor components has been increasing.

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a capacitor component having improved reliability.

According to an aspect of the present disclosure, a capacitor component includes a body including a dielectric layer and an internal electrode layer; and an external electrode disposed on the body and connected to the internal electrode layer. The dielectric layer includes dielectric grains, at least a portion of the dielectric grains has a core-shell structure, and a shell of the core-shell structure contains a rare earth element having an average concentration of more than 0.5 at %.

According to an aspect of the present disclosure, a method for producing a capacitor component includes mixing $BaTiO_3$ and a metal acetate containing dysprosium (Dy) in a solvent, wherein the metal acetate is not dissolved in water; concentrating the mixture to prepare a base material powder; preparing a dielectric green sheet including the base material powder; printing a conductive paste on the dielectric green sheet; laminating a plurality of the printed dielectric green sheets; and sintering the laminate.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
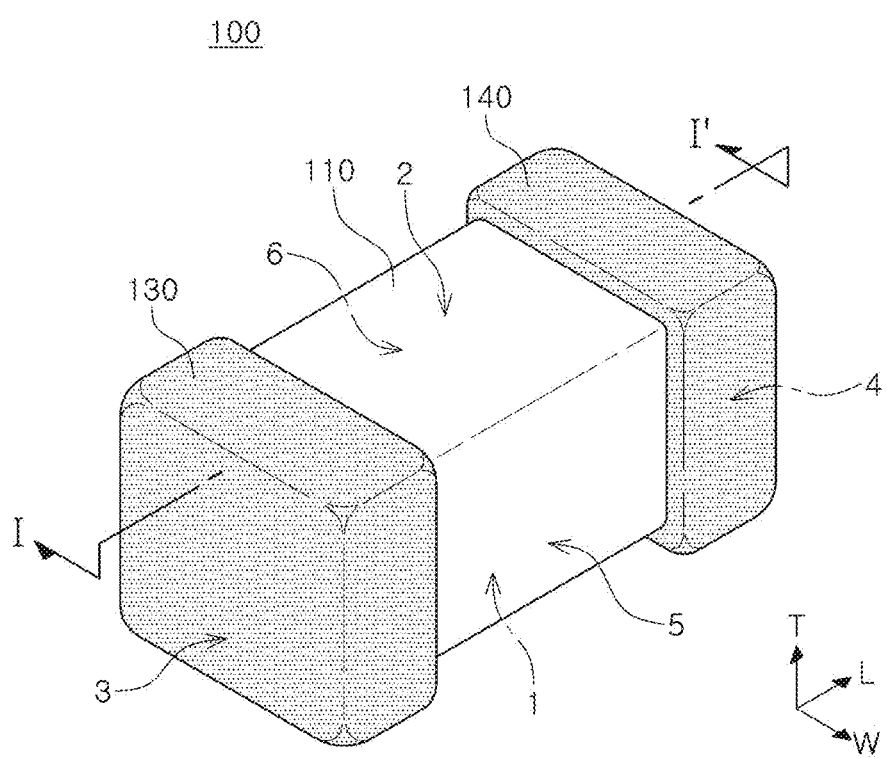
FIG. 1 is a view schematically illustrating a capacitor component according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other intervening elements therebetween. In contrast, when an element is described as being "directly on," "directly connected to," or "directly coupled to" another element, there can be no other intervening elements therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that may occur during manufacturing.

The features of the examples described herein may be combined in various manners as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for the purposes of clarity, illustration, and convenience.

Figure 2:
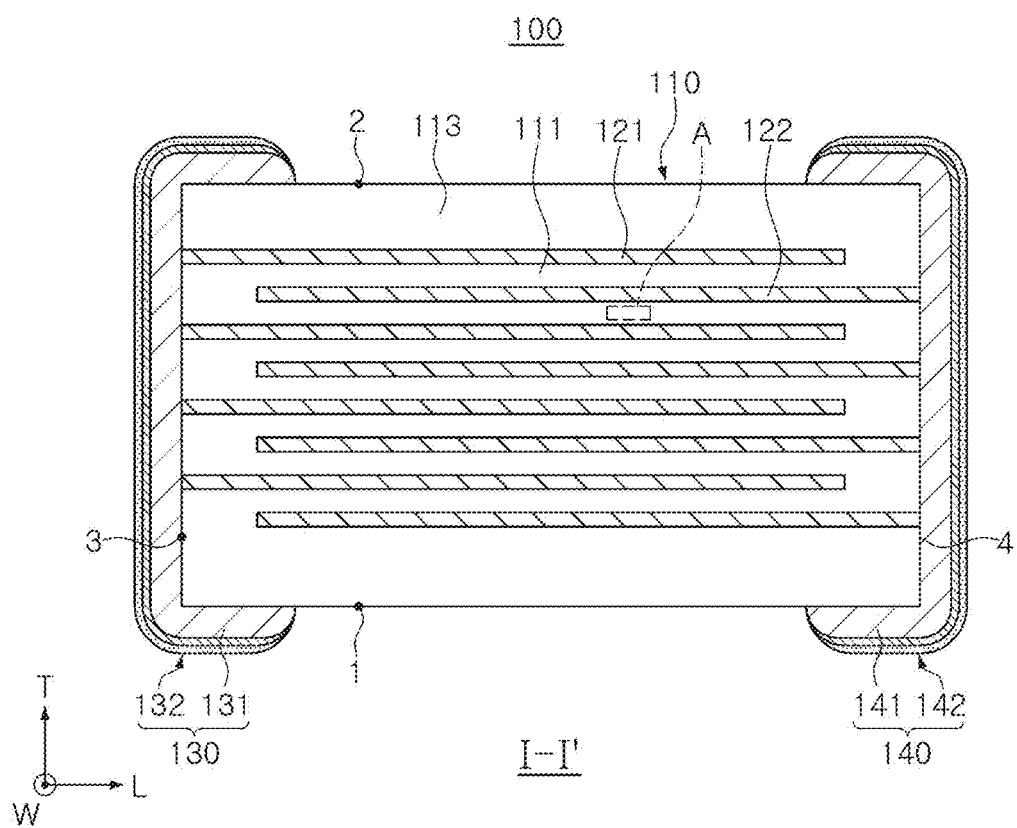
FIG. 2 is a view schematically illustrating a cross section taken along line I-I' of FIG. 1.
Figure 3:
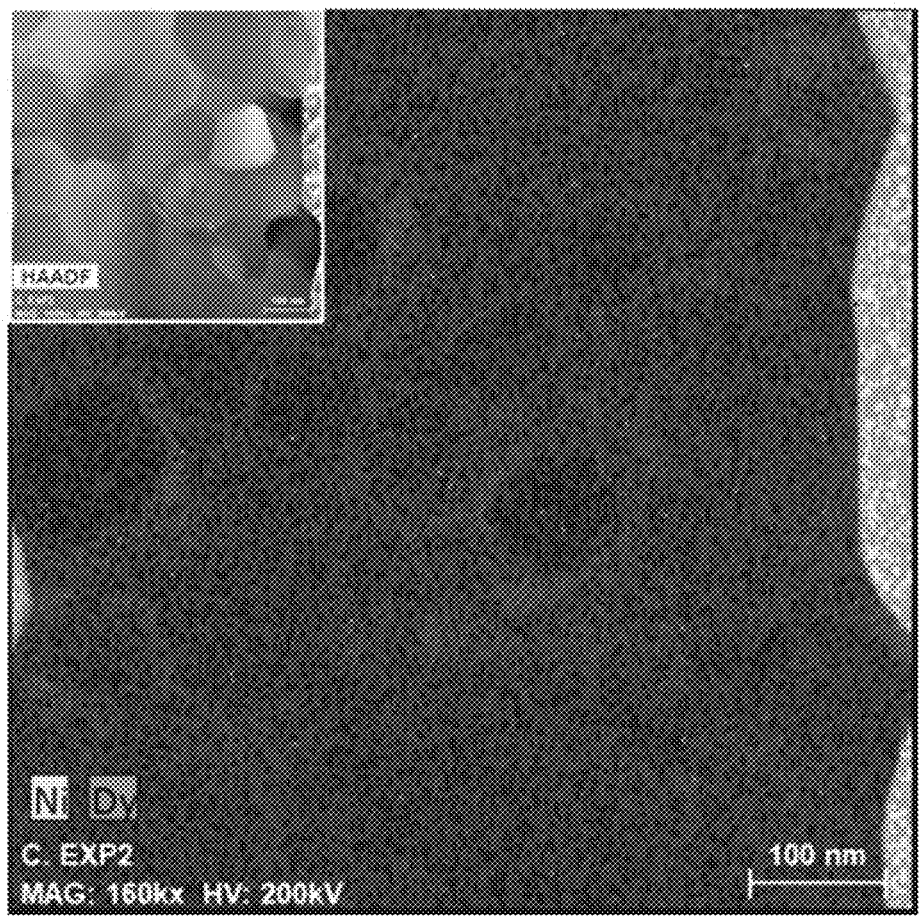
FIG. 3 is a TEM-EDS mapping image of region A of FIG. 2.
Figure 4:
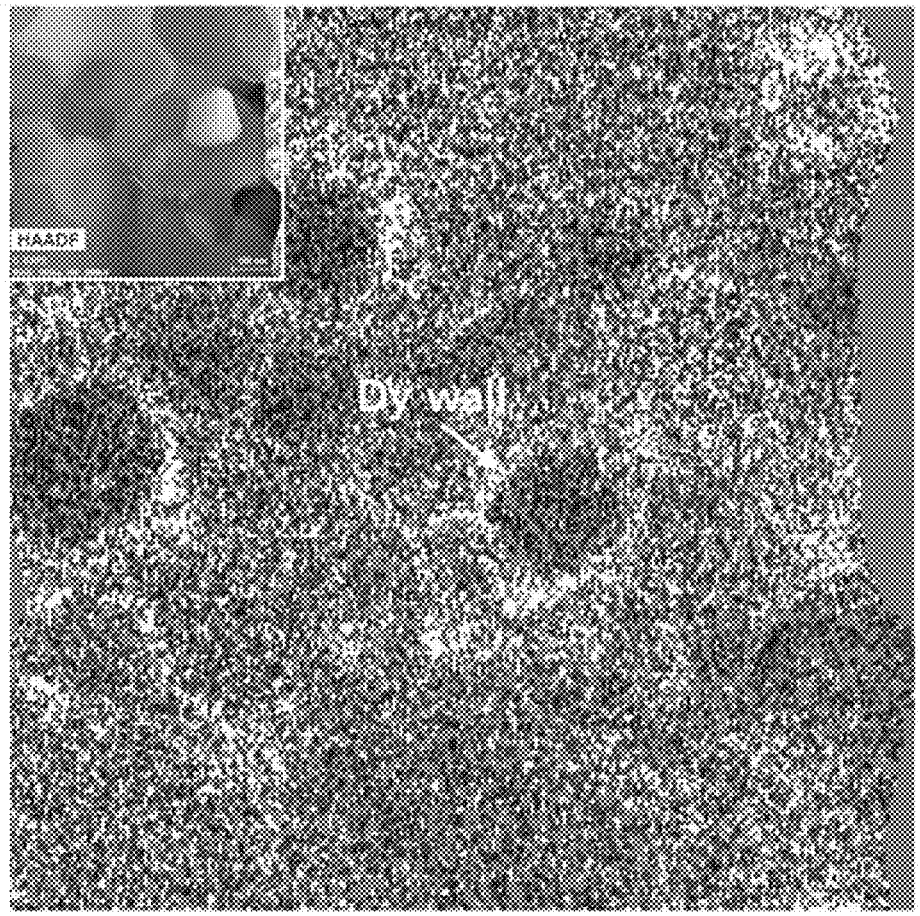
FIG. 4 is a TEM-EDS mapping image illustrating a dysprosium (Dy) concentration (at %) for region A of FIG. 2.
Figure 5:
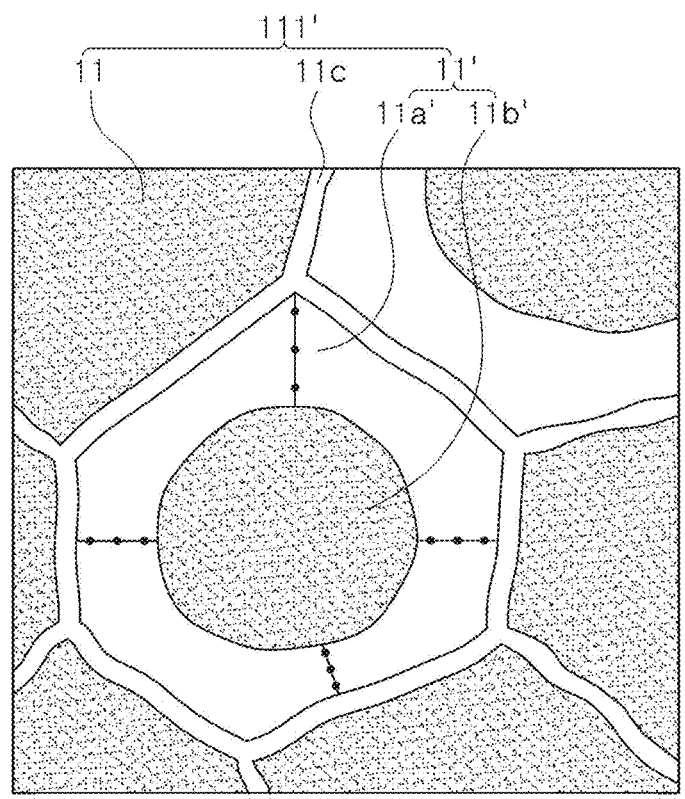
FIG. 5 is a diagram schematically illustrating a microstructure of a dielectric layer.

FIG. 1 is a diagram schematically illustrating a capacitor component according to an embodiment. FIG. 2 is a diagram schematically illustrating a cross-section taken along line I-I' of FIG. 1. FIG. 3 is a TEM-EDS mapping image of region A of FIG. 2. FIG. 4 is a TEM-EDS mapping image illustrating a dysprosium (Dy) concentration (at %) for region A of FIG. 2. FIG. 5 is a diagram schematically illustrating a microstructure of a dielectric layer.

A capacitor component 100 according to an embodiment includes a body 110 including a dielectric layer 111 and internal electrode layers 121 and 122; and external electrodes 130 and 140 disposed on the body 110 and connected to the internal electrode layers 121 and 122. The dielectric layer 111 includes dielectric grains 11 and 11', and at least a portion 11' of the dielectric grains 11 and 11' has a core 11b'-shell 11a' structure, and the shell 11a' contains a rare earth element with an average concentration of more than 0.5 at %.

In the body 110, the dielectric layer 111 and the internal electrode layers 121 and 122 may be alternately stacked.

Although a detailed shape of the body 110 is not particularly limited, as illustrated, the body 110 may have a hexahedral shape or a shape similar thereto. Due to the shrinkage of the ceramic powder included in the body 110 during the sintering process, the body 110 may not have a perfectly straight hexahedral shape, but may have a substantially hexahedral shape.

The body 110 may have first and second surfaces 1 and 2 opposing each other in a first direction (T direction), third and fourth surfaces 3 and 4 connected to the first and second surfaces 1 and 2 and opposing each other in a second direction (L direction), and fifth and sixth surfaces 5 and 6 connected to the first and second surfaces 1 and 2, connected to the third and fourth surfaces 3 and 4, and opposing each other in a third direction (W direction).

The plurality of dielectric layers 111 forming the body 110 are in a sintered state and boundaries between adjacent dielectric layers 111 may be integrated to the extent that they may be difficult to determine without using a scanning electron microscope (SEM).

On the other hand, the dielectric layer 111 may include a material having a perovskite structure expressed as $ABO_3$ as a main component.

For example, the dielectric layer 111 may include at least one of $BaTiO_3$, (Ba, Ca) (Ti, Ca) $O_3$, (Ba, Ca) (Ti, Zr) $O_3$, Ba (Ti, Zr) $O_3$ and (Ba, Ca) (Ti, Sn) $O_3$, as a main component.

In a more detailed example, the dielectric layer 111 may include, as a main component, one or more selected from the group consisting of $BaTiO_3$, $(Ba_{1-x}Ca_x)(Ti_{1-y}Ca_y)O_3$ (where x is 0≤x≤0.3, and y is 0≤y≤0.1), $(Ba_{1-x}Ca_x)(Ti_{1-y}Zr_y)O_3$ (where x is 0≤x≤0.3, and y is 0≤y≤0.5), Ba $(Ti_{1-y}Zr_y)O_3$ (0<y≤0.5) and $(Ba_{1-x}Ca_x)(Ti_{1-y}Sn_y)O_3$ (where x is 0≤x≤0.3, and y is 0≤y≤0.1).

The body 110 may include a capacitance formation portion disposed inside the body 110 and including the first internal electrode layer 121 and the second internal electrode layer 122 disposed to face each other with the dielectric layer 111 interposed therebetween such that capacitance is formed therein, and cover portions 113 formed on the upper portion and the lower portion of the capacitance formation portion.

The capacitance formation portion is a portion contributing to capacitance formation of the capacitor, and may be formed by repeatedly stacking the plurality of first and second internal electrode layers 121 and 122 with the dielectric layer 111 interposed therebetween.

The cover portion 113 may be formed by stacking a single dielectric layer or two or more dielectric layers on the upper and lower surfaces of the capacitance formation portion in the thickness direction, respectively, and basically serves to prevent damage to the internal electrode layer due to physical or chemical stress.

The cover portion 113 does not include an internal electrode layer and may include the same material as the dielectric layer 111. For example, the cover portion 113 may include a ceramic material, for example, a barium titanate ($BaTiO_3$)-based ceramic material.

In addition, a margin portion may be disposed on a side surface of the capacitance formation portion. The margin portion may be disposed on both sides of the ceramic body 110 in the width direction. The margin portion may basically serve to prevent damage to the internal electrode layer due to physical or chemical stress.

The margin portion may be formed by forming an internal electrode layer by applying a conductive paste to the ceramic green sheet except where the margin portion is to be formed. In addition, to suppress the step difference due to the internal electrode layers 121 and 122, after stacking the internal electrode layers, the internal electrode layers are cut to be exposed to the fifth and sixth surfaces 5 and 6 of the body, and then, a single dielectric layer or two or more dielectric layers are laminated on both side surfaces of the capacitance formation portion in the width direction, thereby forming the margin portion.

The internal electrode layers 121 and 122 are alternately stacked with the dielectric layer 111. The internal electrode layers 121 and 122 may include first and second internal electrode layers 121 and 122. The first and second internal electrode layers 121 and 122 are alternately disposed to face each other with the dielectric layer 111 constituting the body 110 interposed therebetween, and may be exposed to the third and fourth surfaces 3 and 4 of the body 110, respectively.

Referring to FIG. 2, the first internal electrode layer 121 is spaced apart from the fourth surface 4 and exposed through the third surface 3, and the second internal electrode layer 122 is spaced apart from the third surface 3 and may be exposed through the fourth surface 4.

In this case, the first and second internal electrode layers 121 and 122 may be electrically separated from each other by the dielectric layer 111 interposed therebetween.

The body 110 may be formed by alternately stacking a ceramic green sheet on which the first internal electrode layer 121 is printed and a ceramic green sheet on which the second internal electrode layer 122 is printed, followed by sintering.

The material for forming the internal electrode layers 121 and 122 is not particularly limited, and a material having excellent electrical conductivity may be used. For example, the internal electrode layers 121 and 122 may be formed by printing a conductive paste for an internal electrode layer, including at least one of nickel (Ni), copper (Cu), palladium (Pd), silver (Ag), gold (Au), platinum (Pt), tin (Sn), tungsten (W), titanium (Ti), and alloys thereof, on a ceramic green sheet.

As the printing method of the conductive paste for the internal electrode layer, a screen-printing method or a gravure printing method may be used, but the present disclosure is not limited thereto.

Meanwhile, to obtain miniaturization and high capacitance of the multilayer ceramic capacitor, increasing the number of stacks by reducing the thicknesses of the dielectric layer and the internal electrode layers is required, and as the thickness of the dielectric layer and the internal electrode layer decreases, reliability may decrease, and characteristics such as insulation resistance and breakdown voltage may decrease.

Accordingly, as the thickness of the dielectric layer and the internal electrode layer decreases, the reliability improvement effect should be highly considered.

In detail, when the average thickness of the internal electrode layers 121 and 122 and the average thickness of the dielectric layer 111 are 400 nm or less, the effect of improving high-temperature lifespan characteristics and TCC characteristics according to the present disclosure may be significant.

The average thickness of the internal electrode layers 121 and 122 may be measured from an image obtained by scanning a longitudinal-thickness cross-section (L-T cross-section) of the body 110 taken from the central portion of the body 110 in the width direction W with a scanning electron microscope (SEM). For example, in obtaining the average thickness of the internal electrode layers 121 and 122, among the internal electrode layers extracted from the image described above, with respect to a total of 5 internal electrode layers including upper two layers and lower two layers, based on one internal electrode layer at the point where the longitudinal center line of the body and the thickness direction center line of the body meet; based on the point where the longitudinal center line and the thickness direction center line of the body meet, five points including left-side two points and right-side two points based on one reference point are determined at equal intervals, and then, the dimension of each point is measured and an arithmetic mean thereof is obtained. For example, the average thickness of the internal electrode layers 121 and 122 may be determined by an average value of the dimensions of a total of 25 points, since with respect to the internal electrode layers of the five layers, the dimensions of respective two points equally spaced (500 nm each) in the left and right directions, based on one point of the internal electrode layer at the point where the longitudinal center line and the thickness direction center line of the body meet, as the one reference point.

The average thickness of the dielectric layer 111 may indicate an average thickness of the dielectric layer 111 disposed between the first and second internal electrode layers 121 and 122.

Like the average thickness of the internal electrode layer, the average thickness of the dielectric layer 111 may also be measured by scanning an image of a longitudinal-thickness direction cross-section (L-T cross-section) of the body 110 with a scanning electron microscope (SEM). For example, in obtaining the average thickness of the dielectric layer 111, among the dielectric layers extracted from the image described above, with respect to a total of 5 dielectric layers including two upper layers and two lower layers, based on one dielectric layer at the point at which the longitudinal center line of the body and the thickness direction center line of the body meet; based on the point at which the longitudinal center line and the thickness direction center line of the body meet, five points including two left-side points and two right-side points based on one reference point are determined at equal intervals, and then, the dimension of each point is measured and an arithmetic mean thereof is obtained. For example, the average thickness of the internal electrode layers 121 and 122 may be determined by an average value of the dimensions of a total of 25 points, since with respect to the internal electrode layers of the five layers, the dimensions of two respective points equally spaced (500 nm each) in the left and right directions, based on one point of the internal electrode layer at the point at which the longitudinal center line and the thickness direction center line of the body meet, as the one reference point, are measured.

Referring to FIG. 5, the dielectric layer 111 includes a plurality of the dielectric grains 11 and 11', and grain boundaries 11c of the dielectric grains 11 and 11' are disposed. At least one of the plurality of dielectric grains is a dielectric grain 11' having a core-shell structure. The dielectric grain 11' having a core-shell structure includes the shell 11a' surrounding at least a portion of the core 11b'.

A multilayer ceramic capacitor (MLCC), which is one of the capacitor components, tends to have a high capacitance and an ultra-thin layer. Securing the withstand voltage characteristics of the dielectric layer in multilayer ceramic capacitors is emerging as a major problem as the capacitance increases and the thickness is reduced, and an increase in the defect rate due to deterioration of the insulation resistance of the dielectric is also emerging as a problem.

To prevent these problems, in the related art, proposed is a method in which rare earth elements such as Dy, Y and Ho are added to suppress the generation of oxygen vacancies and reduce the mobility of oxygen vacancies, and to suppress electrons generated by the addition of a transition metal.

As a method of adding an additive element to a dielectric, there are a method (a metal oxide particle dispersion method) of disintegrating and dispersing metal oxide particles having a size of several tens to hundreds of nm, and a method (a sol dispersion method) of dispersing a sol containing an additive element. However, both the metal oxide particle dispersion method and the sol dispersion method have technical limitations in producing a slurry having a stable dispersion state of 10 nm or less. As a result, in the dielectric grain of the related art having a core-shell structure, there is a technical problem in implementing the average concentration of the rare earth element at 0.5 at % or more in the shell.

Accordingly, in an embodiment of the present disclosure, at least one of the plurality of dielectric grains has a core-shell structure, and the average concentration of the rare earth element contained in the shell of the core-shell structure may be implemented to be more than 0.5 at %. In the case of the rare earth element, the A site of the perovskite structure basically expressed as $ABO_3$ is substituted to reduce the concentration of oxygen vacancy vacancies and thereby compose the shell region, and this shell region may act as a barrier that blocks the flow of electrons at the grain boundaries of dielectric grains to function as preventing leakage current. As a result, the concentration of the rare earth element in the shell region may be increased, thereby enhancing the above-described effect.

The shell 11a' contains rare earth elements having an average concentration of more than 0.5 at %, based on a total number of atoms in the shell portion. In detail, the shell 11a' contains the rare earth element in an average concentration of 0.7 at % or more. If the average concentration of the rare earth element contained in the shell 11a' is 0.5 at % or less, the reliability improvement effect according to an embodiment of the present disclosure may not be sufficient. As the rare earth element, at least one selected from the group consisting of lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Lu) may be used. As a non-limiting example, the shell 11a' may include dysprosium (Dy), but the scope of the present disclosure is not limited thereto.

In the core 11b', rare earth elements are not present or exist only in trace amounts if present.

Since the concentration of the rare earth element changes rapidly at the boundary between the core 11b' and the shell 11a', the core 11b' and the shell 11a' may be easily distinguished, and the distinguishing therebetween may be confirmed through TEM-EDS analysis.

The average concentration of the rare earth element in the shell 11a' may be obtained by performing, for example, line analysis of an Energy Disperse X-Ray Spectrometer (EDS) installed in a transmission electron microscope (TEM) on grains having a core-shell structure. In this case, as illustrated in FIG. 5, TEM-EDS line analysis, for example, may be performed on at least four or more lines of the shell 11a', spaced apart from each other, and the average concentration of the rare earth element in the shell 11a' may indicate an arithmetic average value obtained by dividing the analysis dimension for each of the plurality of lines described above by the number of lines.

The shell 11a' may be disposed to completely cover the surface of the core 11b'. However, the shell 11a' may also be disposed so as not to cover a portion of the surface of the core 11b'. In this case, the shell 11a' may be disposed to cover 90 area % or more of the surface of the core. This is because, if the shell 11a' is disposed to cover less than 90 area % of the surface of the core, the effect of improving reliability according to the present disclosure may not be sufficient. The area % coverage of the surface of the core may be measured from an image obtained by scanning a cross section of the dielectric layer with a transmission electron microscope (TEM).

On the other hand, referring to FIG. 5, the dielectric layer 111 may include dielectric grains 11 not having a core-shell structure in addition to the dielectric grains 11' having a core-shell structure.

In this case, the number of dielectric grains 11' having the core-shell structure among the plurality of dielectric grains 11 and 11' may be 50% or more. In this case, the ratio of the number of dielectric grains having a core-shell structure may be measured from an image obtained by scanning a cross section of the dielectric layer with a transmission electron microscope (TEM).

If the number of dielectric grains having the core-shell structure among the plurality of dielectric grains is less than 50%, the effect of improving high temperature lifespan characteristics and TCC characteristics may be insufficient.

Meanwhile, the size of the dielectric grains does not need to be particularly limited. For example, the average grain size of the dielectric grains may be 50 nm or more and 400 nm or less.

If the average grain size is less than 50 nm, there is a risk that the expected effect may be insufficiently implemented due to the lack of solid solution of additional elements due to the decrease in the dielectric constant and the decrease in the grain growth rate, and if the average grain size exceeds 400 nm, there is a fear that the capacitance change rate based on the temperature and DC voltage may increase and reliability may decrease due to a decrease in the number of dielectric grains per dielectric layer.

The external electrodes 130 and 140 are disposed on the body 110 and are connected to the internal electrode layers 121 and 122.

As illustrated in FIG. 2, the capacitor component 100 may include first and second external electrodes 130 and 140 disposed on the third and fourth surfaces 3 and 4 of the body 110, respectively, and connected to the first and second internal electrode layers 121 and 122 respectively.

Although the structure in which the capacitor component 100 has two external electrodes 130 and 140 is described in this embodiment, the number and shape of the external electrodes 130 and 140 may be changed depending on the shape of the internal electrode layers 121 and 122 or other usage.

The external electrodes 130 and 140 may be formed of any material as long as the material has electrical conductivity, such as metal or the like, and a detailed material may be determined in consideration of electrical characteristics and structural stability, and further, the external electrode may have a multilayer structure.

For example, the external electrodes 130 and 140 may include first electrode layers 131 and 141 disposed on the body 110, and second electrode layers 132 and 142 formed on the first electrode layers 131 and 141.

As a more detailed example of the first electrode layers 131 and 141, the first electrode layers 131 and 141 may be sintered electrodes including a conductive metal and glass, or may be resin-based electrodes including a conductive metal and a resin. In addition, the first electrode layers 131 and 141 may be in a form in which a sintered electrode and a resin-based electrode are sequentially formed on the body 110. Also, the first electrode layers 131 and 141 may be formed by a method of transferring a sheet including a conductive metal onto the body 110 or transferring a sheet including a conductive metal onto the sintering electrode.

As the conductive metal included in the first electrode layers 131 and 141, a material having excellent electrical conductivity may be used, and the material is not particularly limited. For example, the conductive metal may be at least one of nickel (Ni), copper (Cu), palladium (Pd), silver (Ag), gold (Au), platinum (Pt), tin (Sn), tungsten (W), titanium (Ti), and alloys thereof.

The second electrode layers 132 and 142 may be plating layers including at least one of nickel (Ni), tin (Sn), palladium (Pd), and alloys thereof, and may be formed of a plurality of layers.

As a more detailed example of the second electrode layers 132 and 142, the second electrode layers 132 and 142 may be a Ni plating layer or a Sn plating layer, may be in a form in which a Ni plating layer and a Sn plating layer are sequentially formed on the first electrode layers 131 and 141, or may be in a form in which a Sn plating layer, a Ni plating layer, and a Sn plating layer are sequentially formed. In addition, the second electrode layers 132 and 142 may also include a plurality of Ni plating layers and/or a plurality of Sn plating layers.

EXPERIMENTAL EXAMPLE

The ceramic body was manufactured so that dielectric grains of at least a portion of the dielectric layer had a core-shell structure. At this time, Comparative Examples 1 and 2, and Experimental Example were prepared so that the average concentration (at %) of dysprosium (Dy) in the shell was 0.4 at %, 0.5 at %, and 0.85 at %, respectively.

In Comparative Examples 1 and 2 and Experimental Example, the base material powder was prepared by an oxide additive method, a nitrate liquid additive synthesis method, and an acetate method, respectively. In detail, in Comparative Example 1, a core-shell dielectric grain base material powder in which a shell of the core-shell structure contains dysprosium (Dy) was prepared by an oxide additive method. In Comparative Example 2, a first solution was prepared by adding dysprosium oxide and nitric acid to an ethanol solvent, a second solution was prepared by adding barium titanate powder and a dispersing agent to the first solution, and the base material powder was prepared by substitution and concentration of the same. In the experimental example, metal acetate containing dysprosium, a dispersing agent, and barium titanate powder were added together in an ethanol solvent and the resultant was concentrated, thereby preparing a base material powder.

A dielectric green sheet was manufactured using this base material powder, a conductive paste was printed on the dielectric green sheet, and then, a plurality of the printed dielectric green sheets were laminated to prepare a laminate, followed by sintering, to manufacture a sintered body.

In Comparative Examples 1 and 2 and the Experimental Example, except for the above-described base material manufacturing method and the average concentration of dysprosium in the shell of the dielectric grains of the core-shell structure of the sintered body, all other conditions are the same.

Figure 6:
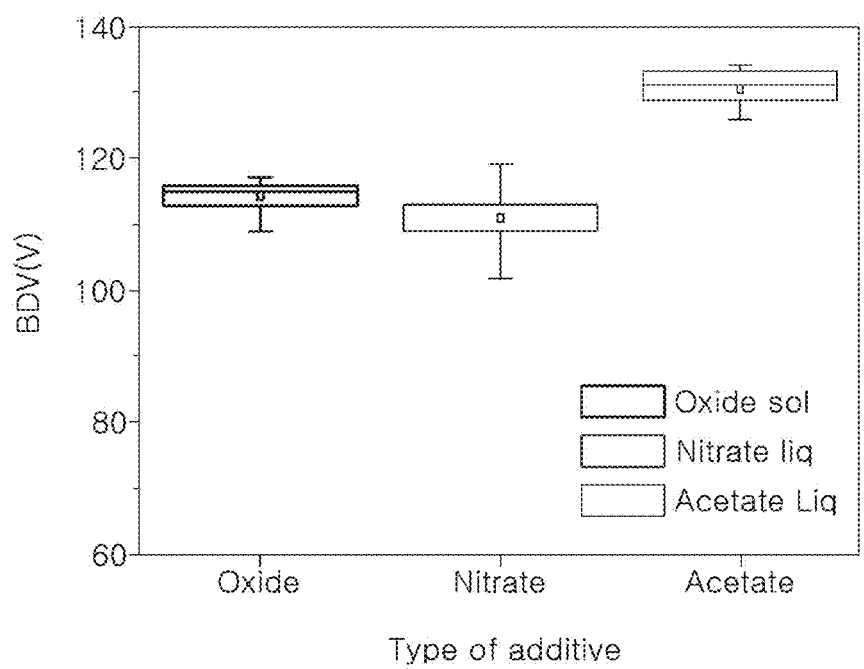
FIG. 6 is a graph illustrating breakdown voltages (BDV) of Comparative Example 1, Comparative Example 2, and the Experimental Example.

FIG. 6 is a graph illustrating the Break Down Voltage (BDV) of Comparative Example 1 (#1), Comparative Example 2 (#2), and Experimental Example (#3). For each of Comparative Examples 1 and 2 and Experimental Example, 20 samples were prepared, and Break Down Voltage (BDV) was evaluated. The BDV evaluation was performed while increasing the voltage from 10 mA to 1,100 V. Referring to FIG. 6, it can be seen that the average BDV of Experimental Example (#3) is higher than those of Comparative Example 1 (#1) and Comparative Example 2 (#2), respectively.

Figure 7A:
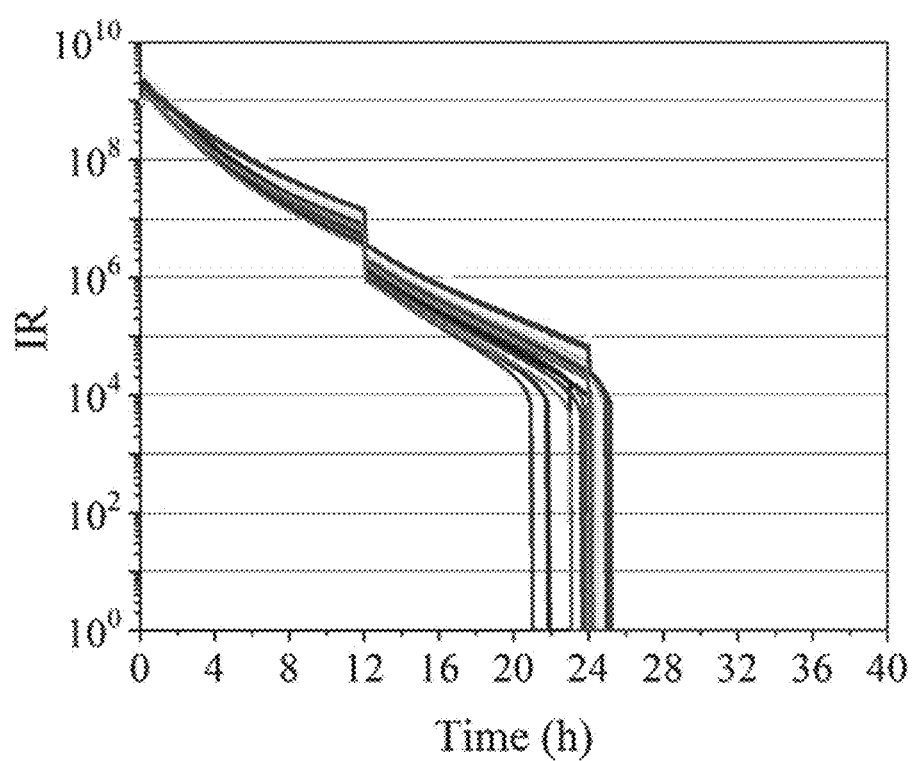
FIGS. 7A to 7C are graphs illustrating Step-IR evaluation results of Comparative Example 1, Comparative Example 2, and the Experimental Example, respectively.
Figure 7B:
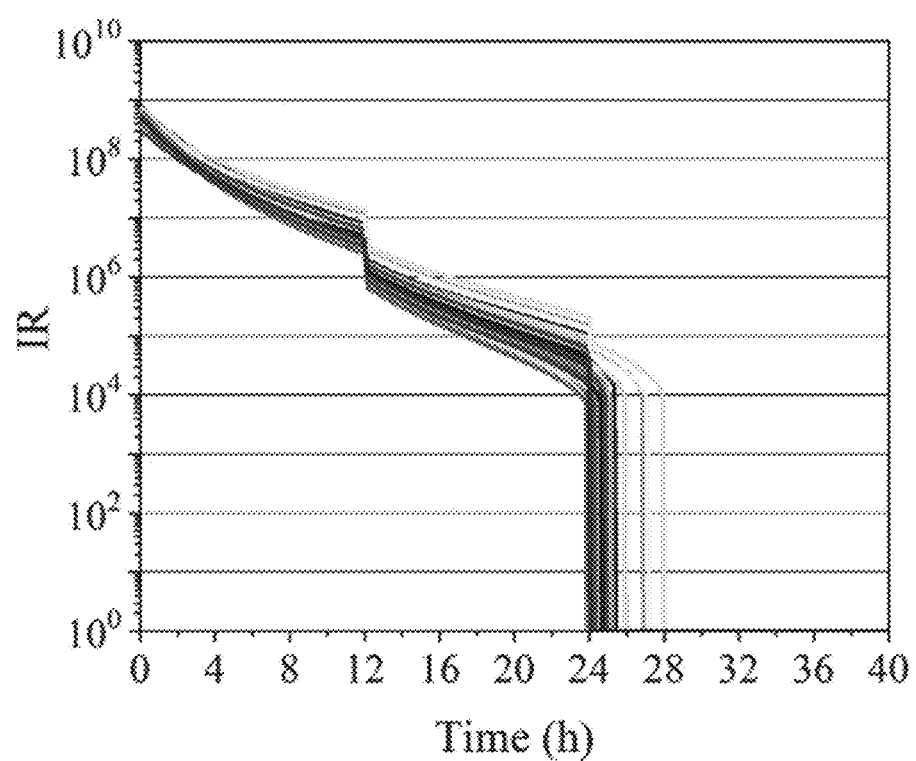
Figure 7C:
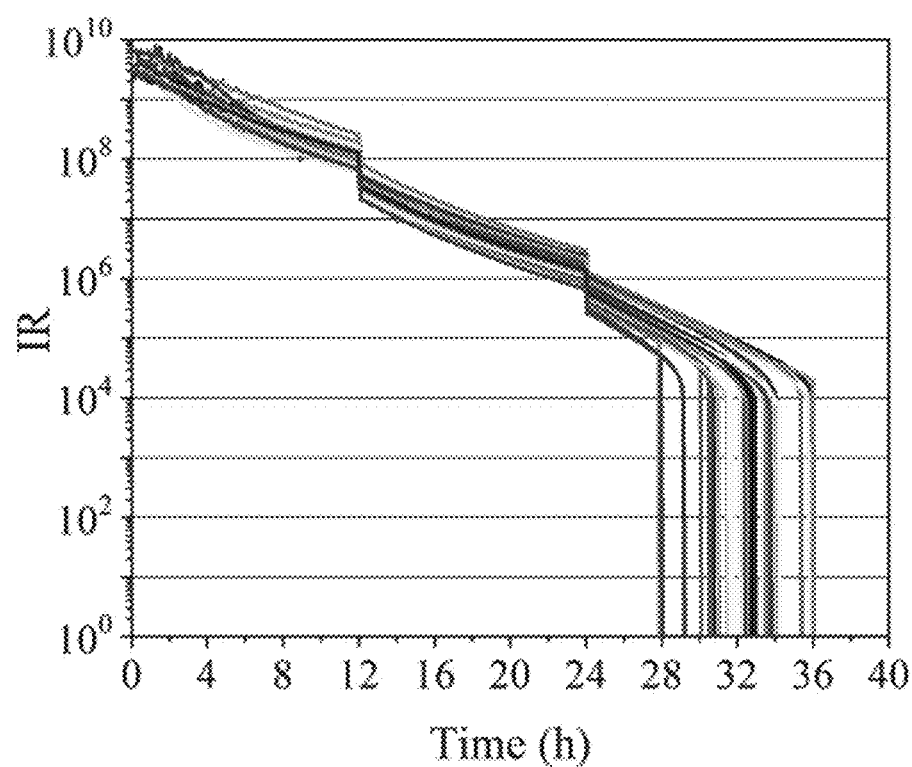

FIGS. 7A, 7B, and 7C are graphs illustrating Step-IR evaluation results of Comparative Example 1, Comparative Example 2, and Experimental Example, respectively. For each of Comparative Examples 1 and 2 and Experimental Example, 40 samples were prepared, and Step IR evaluation was performed. In Step IR evaluation, at a temperature of 105° ° C., 1.5 Vr (15 V, 20 V) was applied for the first 12 hours, 2.0 Vr (20V) was applied for the next 12 hours, 2.5 Vr (25V) was applied for the next 12 hours, and 3.0 Vr (30V) was applied for the next 12 hours, thereby measuring changes in insulation resistance (IR) with time for respective samples. Referring to FIGS. 7 to 9, it can be seen that the initial IR is relatively high in the case of the Experimental Example as compared with Comparative Examples 1 and 2. In addition, when compared with Comparative Examples 1 and 2, in the case of the Experimental Example, it can be seen that the rate of decrease in IR by 2 orders or more during the first 12 hours is reduced.

As set forth above, according to an embodiment, a capacitor component having improved reliability may be provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for producing a capacitor component comprising:
   mixing $BaTiO_3$ and a metal acetate containing dysprosium (Dy) in a solvent to form a mixture, wherein the solvent is ethanol, and the metal acetate is not dissolved in water;
   concentrating the mixture to prepare a base material powder;
   preparing a plurality of dielectric green sheets including the base material powder;
   printing a conductive paste layer on each of the dielectric green sheets;
   laminating a plurality of the printed dielectric green sheets and conductive paste layers to form a laminate; and
   sintering the laminate to form a body of the capacitor component such that the plurality of dielectric sheets form a plurality of dielectric layers and each of the conductive paste layers form an internal electrode layer.

2. The method of claim 1, wherein at least one of the plurality of dielectric layers includes dielectric grains of which at least a portion is surrounded by a wall including dysprosium (Dy) at an average concentration greater than 0.5 at %.

3. The method of claim 2, wherein the average concentration of dysprosium (Dy) in the wall is greater than 0.7 at %.

4. The method of claim 2, wherein the average concentration of dysprosium (Dy) in the wall is at least 0.85 at %.

5. The method of claim 1, wherein the mixture excludes metal oxide containing dysprosium (Dy).

6. The method of claim 1, wherein the mixture excludes nitric acid.

7. The method of claim 1, wherein the mixing of $BaTiO_3$ and the metal acetate includes mixing a dispersing agent with $BaTiO_3$ and the metal acetate.

8. The method of claim 7, wherein the mixture consists of $BaTiO_3$, the metal acetate, the dispersing agent, and ethanol.

9. The method of claim 8, wherein at least one of the plurality of dielectric layers includes dielectric grains of which at least a portion is surrounded by a wall including dysprosium (Dy) at an average concentration of at least 0.85 at %.

* * * * *